A. W. TORKINGTON.
SPRING SUSPENSION FOR VEHICLES.
APPLICATION FILED NOV. 23, 1912.
1,114,553.
Patented Oct. 20, 1914.
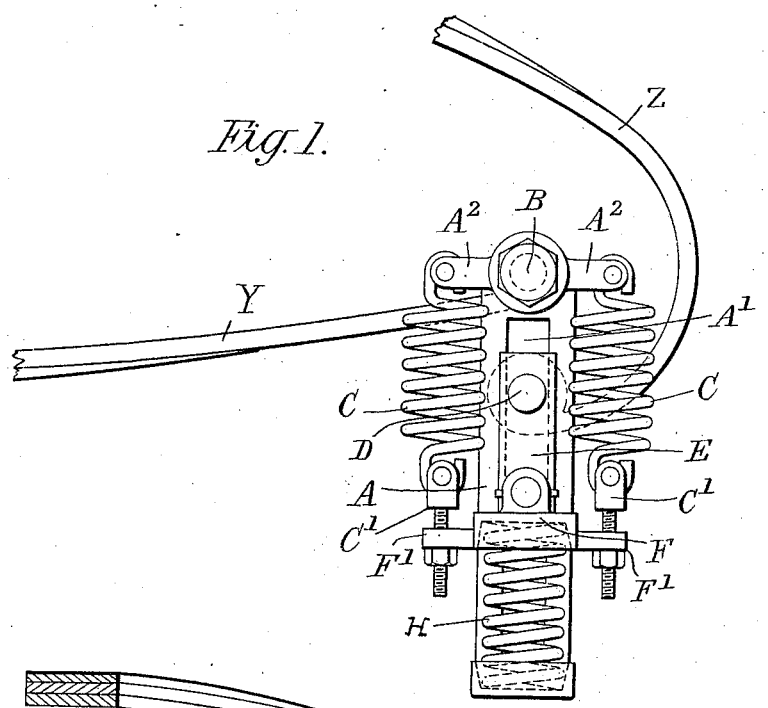
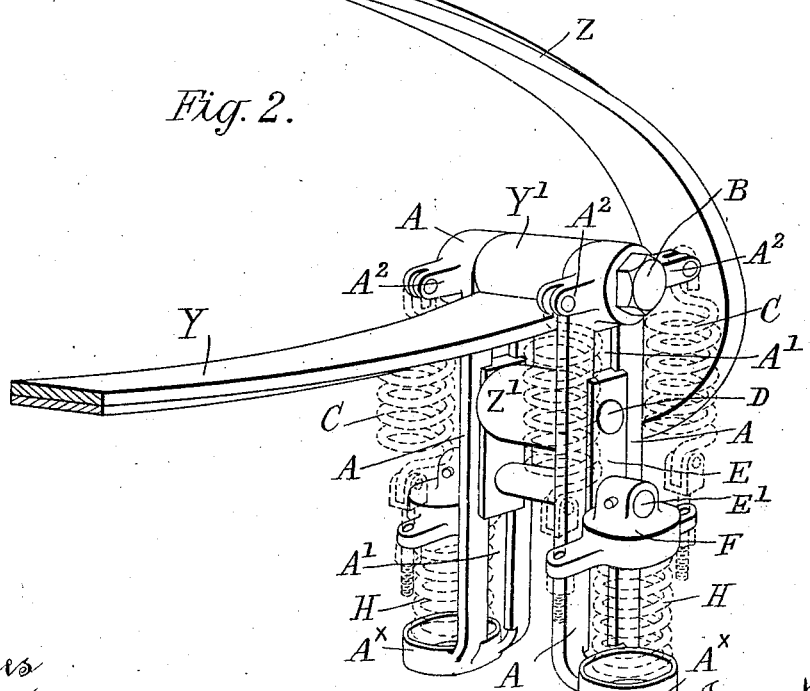

UNITED STATES PATENT OFFICE.

ALFRED WILLIAM TORKINGTON, OF LONDON, ENGLAND.

SPRING SUSPENSION FOR VEHICLES.

1,114,553.  Specification of Letters Patent.  Patented Oct. 20, 1914.

Application filed November 23, 1912. Serial No. 733,102.

*To all whom it may concern:*

Be it known that I, ALFRED WILLIAM TORKINGTON, gentleman, a subject of the King of Great Britain, residing at 16 Hallswelle road, Golders Green, London, England, have invented certain new and useful Improvements in Spring Suspension for Vehicles, of which the following is a specification.

This invention has for its object improvements in or relating to spring suspension devices for motor vehicles or other road vehicles; and is designed to provide a spring suspension device of a novel construction and which is hung or carried on any desired part of the vehicle, usually on the ordinary laminated or leaf springs, said device being provided with a movable member mounted and controlled between vertical springs, one or more of which is or are put in compression, and one or more of which is or are put in tension. This spring suspension device may be applied at any suitable point on a motor vehicle, for example one such spring suspension device may be hung at or toward the rear end of the ordinary laminated spring at each side of the rear of the vehicle, and if desired one such spring suspension device may be hung at or toward the rear end of the ordinary spring at each side of the front of the vehicle.

Reference is had to the accompanying drawings, in which the same parts are indicated by similar reference symbols through the several views.

Figure 1 is a side elevation of my invention showing the method of mounting and attaching same on a vehicle; and Fig. 2 is a perspective view of the same.

A A are two vertically slotted stout frames forming oppositely disposed parallel vertical guideways $A^1$ $A^1$ these two frames being connected together across the top by the stout bolt B which passes through the tubular end $Y^1$ of the laminated spring Y by which means the spring tension device is thereby supported on the end of the laminated spring Y. At the upper end of these stout frames A they are provided with lugs or lateral extensions $A^2$ to each of which there is attached the upper end of a tension spring C, four such tension springs being employed in this arrangement viz. two on each side as shown.

The rear part of the vehicle body (at each side) is attached by means of the tubular end $Z^1$ to a semi-elliptical spring Z (or it may be the end of the dumb iron) having passed therethrough the pin D fixed in the oppositely disposed slides E guided and formed and arranged to slide in the guideway $A^1$. These oppositely disposed sliding members E are attached together by means of, or have passed therethrough at a lower point, the cross pin or tie $E^1$ the end of which pin $E^1$ on each side is journaled or otherwise fixed in or to the sliding cross head or cross piece F provided with lugs or lateral extensions $F^1$ which latter through the medium of the adjustable screw shackles or couplings $C^1$ have the lower end of the spring C thereby attached thereto in an adjustable manner as will be readily seen from the drawings.

The lower end of each stout frame A is provided with the lateral extension $A^x$ forming a support upon which is carried the spring H located between said bottom support $A^x$ and the sliding cross head F.

It will thus be seen that the rear part of the vehicle thus mounted or suspended on the vertical sliding member (formed of the parts E F D and $E^1$) of the spring device located at each side of the rear part of the vehicle will in operation cause the upper springs C to be put in tension and the lower springs H to be put in compression the result being that a very advantageous spring action is obtained without causing or permitting any lateral play or rolling action of the body of the vehicle.

I have illustrated and described preferred and satisfactory constructions, but obvious changes could be made within the scope of the following claims.

What I claim is:—

1. In a spring suspension for vehicles, the combination of a frame provided with vertical guideways and connected to one of two relatively movable elements of a vehicle, lugs projecting from the upper portion of said frame, a cross-head mounted to slide in the guideways in said frame and connected to the other of said vehicle elements, a cap-plate on said cross head, a bed-plate on said frame, a coil spring arranged between said plates, lugs projecting from said cap plate, springs arranged between the lugs on said frame and cap plate, and means for regulating the tension of said springs.

2. In a spring suspension for vehicles, the combination of a main frame comprising a pair of side frames provided with vertically running guideways, means for uniting said frames in spaced relation and for connecting the same to one of two relatively-movable elements of a vehicle, lugs projecting horizontally from either side of the top of said frame, a bed-plate formed on each of said side frames at the base thereof, a cross head mounted to slide in the guideways in each of said frames, means for connecting said cross heads to move in unison and for connecting the same to the other of said vehicle elements, a cap-plate on each of said cross heads in vertical alinement with the bed-plates on said frames, coil springs arranged between said plates, lugs projecting horizontally from either side of said cap plates in vertical alinement with the lugs on said frames, tension springs arranged between said vertically-alining pairs of lugs, and means associated with the lower pairs of lugs for adjusting the tension of said springs.

3. The combination of a vehicle axle spring and a chassis spring, of a spring suspension comprising a pair of side frames provided with vertically alining guideways, perforated bosses formed at the upper ends of said frames, a bolt passing through the alined perforations in said bosses for connecting said side frames together in spaced relation and adapted to be mounted on the free end of said axle spring, pairs of lugs projecting horizontally from said bosses, a cross head mounted to slide in the guideways in each of said frames, a bolt for connecting said cross heads at their lower ends to move in unison, a bolt arranged between said cross heads at their upper ends and adapted to be connected to said chassis spring, a bed plate projecting horizontally from the lower end of each of said side frames, a cap plate projecting from each of said cross heads in vertical alinement with said bed plates, coil springs arranged between said plates, a pair of perforated lugs projecting horizontally from each of said cap plates and in vertical alinement with the respective lugs on said bosses, tension springs secured at their upper ends in said first-named lugs, couplings carried by the lower ends of said tension springs and provided with threaded shanks projecting through the perforations in the second-named bosses, and nuts on said shanks for adjusting the tension of said springs.

In witness whereof I have hereunto set my hand in the presence of two witnesses.

ALFRED WILLIAM TORKINGTON.

Witnesses:
  EDWIN GANDER,
  HERBERT D. JAMESON.